United States Patent
Zhan et al.

(10) Patent No.: US 10,979,554 B2
(45) Date of Patent: Apr. 13, 2021

(54) COMMUNICATION METHOD, WEARABLE DEVICE, SERVER, AND SYSTEM

(71) Applicant: HUAWEI TECHNOLOGIES CO., LTD., Guangdong (CN)

(72) Inventors: Qizhi Zhan, Dongguan (CN); Jiejing Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/626,924

(22) PCT Filed: Oct. 23, 2017

(86) PCT No.: PCT/CN2017/107310
§ 371 (c)(1),
(2) Date: Dec. 27, 2019

(87) PCT Pub. No.: WO2019/000729
PCT Pub. Date: Jan. 3, 2019

(65) Prior Publication Data
US 2020/0162601 A1    May 21, 2020

(30) Foreign Application Priority Data
Jun. 29, 2017   (CN) .......................... 201710514240.7

(51) Int. Cl.
*H04M 1/725* (2021.01)
*H04W 12/00* (2021.01)
(Continued)

(52) U.S. Cl.
CPC ........ *H04M 1/72597* (2013.01); *G06F 1/163* (2013.01); *H04M 1/72552* (2013.01);
(Continued)

(58) Field of Classification Search
CPC ..... H04W 24/02; H04W 88/02; H04W 76/30; H04W 36/0069; H04W 36/0088;
(Continued)

(56) References Cited

U.S. PATENT DOCUMENTS 9,420,538 B2    8/2016  Preteseille et al.
9,906,991 B1 *  2/2018  Peddiraju ................ H04L 43/16
(Continued)

FOREIGN PATENT DOCUMENTS

CN    103415039 A    11/2013
CN    104754141 A    7/2015
(Continued)

OTHER PUBLICATIONS

International Search Report for PCT/CN2017/107310 dated Feb. 28, 2018, 4 pages.
(Continued)

*Primary Examiner* — Kwasi Karikari

(57) ABSTRACT

Embodiments of this application disclose a communication method, a wearable device, a server, and a system. The method includes: obtaining, by a wearable device that is in a cellular-based Narrowband Internet of Things mode, an unreceived communication notification message from a server based on a preset period or a preset time point; and when a user needs to reply to the communication notification message, switching, by the wearable device, from the cellular-based Narrowband Internet of Things mode to a cellular mobile network mode to reply. According to the embodiments of this application, low-power voice paging of the wearable device can be implemented, and a usage time of the wearable device can be prolonged.

16 Claims, 8 Drawing Sheets

(51) Int. Cl.
  *H04W 4/14* (2009.01)
  *H04W 48/06* (2009.01)
  *H04W 76/10* (2018.01)
  *G06F 1/16* (2006.01)
  *H04W 68/00* (2009.01)

(52) U.S. Cl.
  CPC ....... *H04W 4/14* (2013.01); *H04W 12/00403* (2019.01); *H04W 48/06* (2013.01); *H04W 68/005* (2013.01); *H04W 76/10* (2018.02)

(58) Field of Classification Search
  CPC . H04W 36/06; H04W 52/0274; H04W 60/04; H04W 76/10; H04W 76/27; H04W 36/00; H04W 36/0016; H04W 36/0085; H04W 36/08; H04W 76/15
  See application file for complete search history.

(56) References Cited

U.S. PATENT DOCUMENTS

| | | | |
|---|---|---|---|
| 2014/0378084 A1 | 12/2014 | Preteseille et al. | |
| 2015/0334554 A1* | 11/2015 | Song | H04W 4/70 455/558 |
| 2018/0262941 A1* | 9/2018 | Huang | H04W 8/10 |
| 2019/0327039 A1 | 10/2019 | Hwang et al. | |

FOREIGN PATENT DOCUMENTS

| | | | |
|---|---|---|---|
| CN | 104853037 A | 8/2015 |
| CN | 105338171 A | 2/2016 |
| CN | 105577967 A | 5/2016 |
| CN | 106686048 A | 5/2017 |
| CN | 106792957 A | 5/2017 |
| CN | 106879038 A | 6/2017 |
| EP | 2947540 A1 | 11/2015 |
| WO | 2013/087489 A1 | 6/2013 |
| WO | 2013087489 A1 | 6/2013 |
| WO | 2016208897 A1 | 12/2016 |
| WO | 2017081062 A1 | 5/2017 |

OTHER PUBLICATIONS

XP051053610 R1-160270 Ericsson,"NB-IoT—Paging",3GPP TSG-RAN WG1 Meeting #84,St Julians, Malta, Feb. 15-19, 2016,total 11 pages.

XP055635368 GSM Association NB-IoT Deployment Guide to Basic Feature set Requirements Version 1.0,dated Aug. 2, 2017,total 30 pages.

Extended European Search report issued in EP Application No. 17915708.6, dated Aug. 21, 2020 (16 pages).

Zheng Qin et al.,"Electornic Commerce"—Maintaining logical connections,dated Jun. 30, 2002,total 6 pages.

* cited by examiner

COMMUNICATION METHOD, WEARABLE DEVICE, SERVER, AND SYSTEM

CROSS-REFERENCE TO RELATED APPLICATIONS

This application is a National Stage of International Application No. PCT/CN2017/107310, filed on Oct. 23, 2017, which claims priority to Chinese Patent Application 201710514240.7, filed on Jun. 29, 2017. Both of the aforementioned applications are hereby incorporated by reference in their entireties.

TECHNICAL FIELD

This application relates to the field of communications technologies, and in particular, to a communication method, a wearable device, a server, and a system.

BACKGROUND

A wearable device is a portable device that is directly worn by a user or that is integrated into clothes or accessories of a user. The wearable device is a hardware device, and can also implement, through software support, data exchange, and cloud-based interaction, powerful functions such as sport data monitoring, user physiological parameter monitoring, and an instant communication function or a conventional communication function such as calling or a short message service.

In the prior art, a conventional wearable device needs to receive an in-coming call or an instant message such as an SMS message in real time, and therefore needs to always keep connected to an operator. Consequently, frequent charging is required due to power consumption. Even in a case of light use, charging may be required once a day. This is inconvenient for a user. However, if the wearable device is kept in a low-power operating mode, such as a cellular-based Narrowband Internet of Things (Narrow Band Internet of Things, NB-IoT) mode, the wearable device cannot perform a voice communication data service in the low-power operating mode; as a result, the user loses some important calls or SMS messages.

SUMMARY

In view of this, embodiments of this application provide a communication method, a wearable device, a server, and a system, so as to implement low-power voice paging of a wearable device, and prolong a usage time of the wearable device.

According to a first aspect, an embodiment of this application provides a communication method. The method may include:

obtaining, by a wearable device that is in a cellular-based Narrowband Internet of Things mode, an unreceived communication notification message from a server based on a preset period or a preset time point; and when a user needs to reply to the communication notification message, switching, by the wearable device, from the cellular-based Narrowband Internet of Things mode to a cellular mobile network mode to reply.

The wearable device is regularly connected to the server by using a Narrowband Internet of Things (NB-IoT) technology, thereby establishing a data channel with the server and maintaining real-time connection for a period of time to regularly obtain the communication notification message. In this way, a low-power operating status of the wearable device is implemented, and transmission of a voice data service can also be ensured. This greatly improves user experience. In addition, compatibility with an existing cellular communications technology is achieved, so that implementation costs are relatively low. In a possible implementation, the communication notification message includes a call notification message, an SMS message notification message, or an instant communication application notification message.

In a possible implementation, if the wearable device uses an independent subscriber identity module card, the communication notification message is generated based on a communication request that is to be sent to the wearable device.

When the wearable device uses the independent SIM card, another user may directly send the communication request to the wearable device.

In a possible implementation, if the wearable device shares a subscriber identity module card with a mobile terminal, the communication notification message is generated based on a communication request that is to be sent to the mobile terminal.

When the wearable device shares the SIM card with the mobile terminal, the communication request is usually directed at the mobile terminal. However, the server may push the communication notification message to the wearable device, to help the user to obtain, when the mobile terminal is not used, a notification message in a timely manner and choose to reply.

In a possible implementation, the method further includes:

when obtaining the unreceived communication notification message, performing filtering according to a filter condition preconfigured by the user.

There may be a relatively large quantity of communication notification messages; therefore, a quantity of obtained communication notification messages can be reduced through filtering, so that effectiveness and pertinence of the communication notification messages are improved, and interference from useless information is reduced.

In a possible implementation, the filter condition includes at least one of the following:

obtaining a communication notification message initiated by a contact in a contact whitelist;

obtaining a preset quantity of communication notification messages;

obtaining a communication notification message initiated by a contact with a preset priority;

obtaining a communication notification message generated by an application with a preset priority;

obtaining a communication notification message that is not received in the preset period; and obtaining a communication notification message that is not viewed or not received within preset duration preceding the preset time point.

Through setting and combination of a plurality of filter criteria, various filtering requirements of the user can be satisfied, so as to help the user to obtain, based on a requirement and preference of the user, a most accurate communication notification message.

In a possible implementation, the switching, by the wearable device when a user needs to reply to the communication notification message, from the cellular-based Narrowband Internet of Things mode to a cellular mobile network mode to reply includes:

if the communication notification message is the call notification message, switching, according to a dialing instruction entered by the user, from the cellular-based Narrowband Internet of Things mode to the cellular mobile network mode to dial;

if the communication notification message is the SMS message notification message, switching, according to a dialing instruction entered by the user, from the cellular-based Narrowband Internet of Things mode to the cellular mobile network mode to dial, or switching, according to SMS message reply content and an SMS message reply instruction that are entered by the user, from the cellular-based Narrowband Internet of Things mode to the cellular mobile network mode to reply by using an SMS message; or if the communication notification message is the instant communication application notification message, switching, according to reply content and a reply instruction that are entered by the user, from the cellular-based Narrowband Internet of Things mode to the cellular mobile network mode to reply.

For different types of communication notification messages, different reply manners may be provided, to help the user to perform an operation and reply.

According to a second aspect, an embodiment of this application provides a communication method. The method may include:

receiving, by a server, a communication request that is to be sent to a wearable device, or a communication request that is to be sent to a mobile terminal that shares a subscriber identity module card with the wearable device;

generating, by the server, a communication notification message based on the communication request, and storing the communication notification message; and when receiving an obtaining request of the wearable device that is in a cellular-based Narrowband Internet of Things mode, sending, by the server, the communication notification message to the wearable device.

In a possible implementation, the communication notification message includes a call notification message, an SMS message notification message, or an instant communication application notification message.

In a possible implementation, the method further includes:

when sending the communication notification message to the wearable device, performing filtering according to a filter condition preconfigured by a user.

In a possible implementation, the filter condition includes at least one of the following:

sending a communication notification message initiated by a contact in a contact whitelist;

sending a preset quantity of communication notification messages;

sending a communication notification message initiated by a contact with a preset priority;

sending a communication notification message generated by an application with a preset priority;

sending a communication notification message that is not received by the wearable device in the preset period; and sending a communication notification message that is not viewed or not received by the wearable device within preset duration preceding the preset time point.

In a possible implementation, the generating a communication notification message based on the communication request, and storing the communication notification message includes:

configuring a message center that is configured to buffer the communication notification message;

generating the communication notification message based on the communication request; and storing the communication notification message in the message center.

In a possible implementation, the method further includes:

periodically removing a sent communication notification message from the message center.

According to a third aspect, an embodiment of this application provides a wearable device. The wearable device may include:

a transceiver unit, configured to obtain, for the wearable device that is in a cellular-based Narrowband Internet of Things mode, an unreceived communication notification message from a server based on a preset period or a preset time point; and a processing unit, configured to: when a user needs to reply to the communication notification message, switch the wearable device from the cellular-based Narrowband Internet of Things mode to a cellular mobile network mode to reply.

In a possible implementation, the communication notification message includes a call notification message, an SMS message notification message, or an instant communication application notification message.

In a possible implementation, if the wearable device uses an independent subscriber identity module card, the communication notification message is generated based on a communication request that is to be sent to the wearable device.

In a possible implementation, if the wearable device shares a subscriber identity module card with a mobile terminal, the communication notification message is generated based on a communication request that is to be sent to the mobile terminal.

In a possible implementation, the processing unit is further configured to:

when obtaining the unreceived communication notification message, perform filtering according to a filter condition preconfigured by the user.

In a possible implementation, the filter condition includes at least one of the following:

obtaining a communication notification message initiated by a contact in a contact whitelist;

obtaining a preset quantity of communication notification messages;

obtaining a communication notification message initiated by a contact with a preset priority;

obtaining a communication notification message generated by an application with a preset priority;

obtaining a communication notification message that is not received in the preset period; and obtaining a communication notification message that is not viewed or not received within preset duration preceding the preset time point.

In a possible implementation, if the communication notification message is the call notification message, the processing unit is configured to switch, according to a dialing instruction entered by the user, the wearable device from the cellular-based Narrowband Internet of Things mode to the cellular mobile network mode to dial;

if the communication notification message is the SMS message notification message, the processing unit is configured to switch, according to a dialing instruction entered by the user, the wearable device from the cellular-based Narrowband Internet of Things mode to the cellular mobile network mode to dial, or the processing unit is configured to switch, according to SMS message reply content and an SMS message reply instruction that are entered by the user, the wearable device from the cellular-based Narrowband Internet of Things mode to the cellular mobile network mode to reply by using an SMS message; or if the communication notification message is the instant communication application notification message, the processing unit is configured to switch, according to reply content and a reply instruction that are entered by the user, the wearable device from the cellular-based Narrowband Internet of Things mode to the cellular mobile network mode to reply.

According to a fourth aspect, an embodiment of this application provides a wearable device. The wearable device may include:

a processor, a memory, and a bus, where the processor and the memory are connected by using the bus, the memory is configured to store a set of program code, and the processor is configured to invoke the program code stored in the memory, to perform steps in any one of the first aspect or the implementations of the first aspect in the embodiments of this application.

According to a fifth aspect, an embodiment of this application provides a server. The server may include:

a transceiver unit, configured to receive a communication request that is to be sent to a wearable device, or a communication request that is to be sent to a mobile terminal that shares a subscriber identity module card with the wearable device;

a processing unit, configured to generate a communication notification message based on the communication request; and a storage unit, configured to store the communication notification message; where the transceiver unit is further configured to: when receiving an obtaining request of the wearable device that is in a cellular-based Narrowband Internet of Things mode, send the communication notification message to the wearable device.

In a possible implementation, the communication notification message includes a call notification message, an SMS message notification message, or an instant communication application notification message.

In a possible implementation, the processing unit is further configured to:

when the communication notification message is being sent to the wearable device, perform filtering according to a filter condition preconfigured by a user.

In a possible implementation, the filter condition includes at least one of the following:

sending a communication notification message initiated by a contact in a contact whitelist;

sending a preset quantity of communication notification messages;

sending a communication notification message initiated by a contact with a preset priority;

sending a communication notification message generated by an application with a preset priority;

sending a communication notification message that is not received by the wearable device in the preset period; and sending a communication notification message that is not viewed or not received by the wearable device within preset duration preceding the preset time point.

In a possible implementation, the processing unit is further configured to:

configure a message center that is configured to buffer the communication notification message;

generate the communication notification message based on the communication request; and store the communication notification message in the message center.

In a possible implementation, the processing unit is further configured to:

periodically remove a sent communication notification message from the message center.

According to a sixth aspect, an embodiment of this application provides a server. The server may include:

a processor, a memory, and a bus, where the processor and the memory are connected by using the bus, the memory is configured to store a set of program code and a communication notification message, and the processor is configured to invoke the program code stored in the memory, to perform steps in any one of the second aspect or the implementations of the second aspect in the embodiments of this application.

According to a seventh aspect, an embodiment of this application provides a computer readable storage medium. The computer readable storage medium stores an instruction. When the instruction runs on a computer, the method in any one of the first aspect or the possible implementations of the first aspect is implemented.

According to an eighth aspect, an embodiment of this application provides a computer readable storage medium. The computer readable storage medium stores an instruction. When the instruction runs on a computer, the method in any one of the second aspect or the possible implementations of the second aspect is implemented.

According to a ninth aspect, an embodiment of this application provides a system. The system may include:

the wearable device according to any one of the third aspect or the implementations of the third aspect of this application;

the server according to any one of the fifth aspect or the implementations of the fifth aspect of this application; and a first mobile terminal, configured to send a communication request to the wearable device or a second terminal that shares a subscriber identity module card with the wearable device.

DESCRIPTION OF EMBODIMENTS

Figure 1:
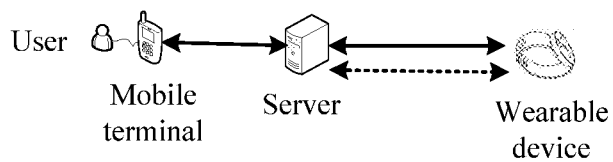
FIG. 1 is a schematic diagram of a system architecture of communication with a wearable device according to an embodiment of this application.

The following describes the embodiments of this application with reference to the accompanying drawings in the embodiments of this application. The terms "include", "comprise", and any other variant thereof in the specification, claims, and accompanying drawings of this application are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit inherent to the process, the method, the system, or the device.

The terms used in the embodiments of this application are merely for the purpose of describing specific embodiments, but are not intended to limit this application. The terms "a", "the", and "this" of singular forms used in the embodiments and the appended claims of this application are also intended to include plural forms, unless otherwise specified in a context clearly. It should be further understood that, the term "and/or" used in this specification indicates and includes any or all possible combinations of one or more associated listed items. In addition, the character "/" in this specification generally indicates an "or" relationship between associated objects.

It should be understood that although terms "first", "second", "third", and the like may be used in the embodiments of this application to describe various messages, requests, and terminals, the messages, requests, and terminals are not limited by the terms. These terms are merely used to differentiate the messages, requests, and terminals. For example, without departing from the scope of the embodiments of this application, a first terminal may also be referred to as a second terminal, and similarly, a second terminal may also be referred to as a first terminal.

Depending on a context, for example, words "if" or "provided that" used herein may be explained as "while" or "when" or "in response to determining" or "in response to detecting". Similarly, depending on a context, phrases "if determining" or "if detecting (a stated condition or event)" may be explained as "when determining" or "in response to determining" or "when detecting (the stated condition or event)" or "in response to detecting (the stated condition or event)".

With continuous development of communications technologies and user requirements on portability of communications devices, a wearable device has emerged and is at a stage of rapid development. Product forms of the wearable device may include a wrist-supported watch class (including products such as watches and wrist straps), a foot-supported shoes class (including shoes, socks, or other future products worn on a leg), a head-supported glass class (including glasses, helmets, head bands, and the like), and other product forms such as smart clothes, bags, crutches, and accessories.

An existing wearable device is capable of implementing sport data monitoring, user physiological parameter monitoring, and voice communication, and implementing various functions by installing various applications. However, limited by a size of the wearable device and a current battery technology, a usage time of the wearable device is relatively short. Narrowband Internet of Things (Narrow Band Internet of Things, NB-IoT) is a new Low Power Wide Area Network (Low Power Wide Area Network, LPWAN) technology of narrowband cellular communications. The NB-IoT is constructed on a cellular network, consumes only about a 180 KHz bandwidth, and may be directly deployed in a communications network such as a Global System for Mobile Communications (Global System for Mobile Communications, GSM) network, a Universal Mobile Telecommunications System (Universal Mobile Telecommunication System, UMTS) network, or a Long Term Evolution (Long Term Evolution, LTE) network, to reduce deployment costs and implement smooth upgrade. The NB-IoT supports a cellular data connection of a low power device in a wide area network and supports an efficient connection of a device that has a long standby time and a relatively high network connection requirement. A battery lifespan of an NB-IoT device may be increased to at least 10 years, and the NB-IoT device is also capable of providing very comprehensive indoor cellular data connection coverage. The NB-IoT has the following characteristics: strong linking, high coverage, low costs, and low power consumption. The low power consumption character is an important indicator of an Internet of Things application. Particularly, for some devices whose batteries cannot be frequently charged or in some circumstances in which batteries cannot be frequently charged, for example, various sensing and monitoring devices that are deployed on mountains, in the wilderness, or in remote areas, it is impossible for these devices to be charged once a day like a smartphone, and a battery lifespan as long as years is a most essential requirement. The NB-IoT focuses on a small data volume and small rate applications. Therefore, power consumption of the NB-IoT device can be very small, and a device standby time can be greatly increased from months in the past to years. In addition, there is another great advantage to choose the NB-IoT: The NB-IoT does not require that a new network be constructed, and basically a radio frequency and an antenna of an existing device can be reused. Using CMCC as an example, 900 MHz includes a relatively wide frequency band, and only a part of a 2G frequency band needs to be vacated so that both the Long Term Evolution (Long Term Evolution, LTE) and the NB-IoT can be directly deployed. A low rate, low power consumption, and low bandwidth also bring an advantage of low costs to an NB-IoT chip and module. The cellular mobile network (Cellular network) is a mobile communications hardware architecture in which a mobile phone service area is divided into regular hexagonal sub-areas, a base station is deployed for each cell, and a structure that resembles a "cellular" shape is formed. Therefore, such a mobile communication manner is referred to as a cellular mobile communication manner. A cellular mobile network mode may include but is not limited to a 2nd generation mobile phone communications technical specification (2G), a 3rd generation mobile phone communications technical specification (3G), a 4th generation mobile phone communications technical specification (4G), a 5th generation mobile phone communications technical specification (5G), and a future possible communications technology with a higher specification such as 6G.

The following describes the embodiments of this application with reference to a voice communication service scenario and the NB-IoT.

FIG. 1 is a schematic diagram of a system architecture of communication with a wearable device according to an embodiment of this application. The system architecture may include: a mobile terminal, a wearable device, and a server.

Optionally, the mobile terminal may be a mobile phone, a tablet computer, or the like that has a communication function.

The server herein may be a server that is configured to provide a voice communication service, such as a server deployed in a base station, or may be a server of a service provider that provides an application service (such as an instant communication application). A message center may be configured on the server, to store a communication notification message. During storage of communication notification messages, a communication notification message within a preset time period such as one day or one week may be stored, a communication notification message newly generated after a communication notification message is obtained from the wearable device last time may be stored, and a communication notification message that is not received or not viewed by a user may be stored. The communication notification messages stored in the message center may be periodically removed. The communication notification message herein may include, based on different services, a call notification message used to indicate that there is a missed call, an SMS message notification message used to indicate that there is an unread SMS message, a notification message used to indicate that there is an unread push message of various applications (APP) such as an instant communication application, a notification message used to indicate that there is a system notification, and the like.

For ease of description, in FIG. 1, a mobile phone, a service in a base station, and a smart band that are in a voice communication scenario are used as examples for description.

As shown in FIG. 1, the mobile phone, the server, and the smart band are included, the mobile phone and the server are connected by using a cellular mobile network, and the smart band and the server may be connected based on NB-IoT (shown by a dashed line in the figure) or may be connected based on the cellular mobile network (shown by a solid line in the figure). In the embodiment of FIG. 1, a storage area that may be referred to as a message center may be configured for the server, to store a communication notification message of a call, an SMS message, an application, or a system. A heartbeat connection between the smart band and the server may be maintained based on the NB-IoT (shown by the dashed line in the figure). To be specific, a user-defined structure (a heartbeat packet) is periodically sent, to notify the other party that a local party is still on line, so as to ensure effectiveness of the connection. The smart band may obtain the communication notification message from the server based on a preset period or a preset time point, and display the communication notification message to the user for viewing, or may obtain the communication notification message based on a real-time obtaining operation of the user. When the user determines that the communication notification message needs to be replied to, and dials, replies by using an SMS message, or replies by using an instant communication application, the smart band switches, based on a user operation, to a cellular mobile network mode, such as a 2G/3G/4G/5G network (shown by the solid line in the figure), to correspondingly rely. Therefore, low-power voice paging is implemented, and a usage time of the wearable device is prolonged.

It should be noted that, when obtaining the communication notification message, the wearable device may automatically obtain the communication notification message from the server based on the preset period configured by the user, for example, every two hours, or based on the preset time point, for example, 09:00 a.m. every day; or may obtain the communication notification message based on an obtaining operation that is proactively initiated by the user. When viewing the communication notification message, the user may view the communication notification message immediately after the communication notification message is obtained by the wearable device, or may choose to view the communication notification message later. When presenting the communication notification message, based on a hardware design and/or a user configuration, the wearable device may use various presentation manners such as a display or a voice notification. This is not limited in this embodiment of this application.

Figure 2:
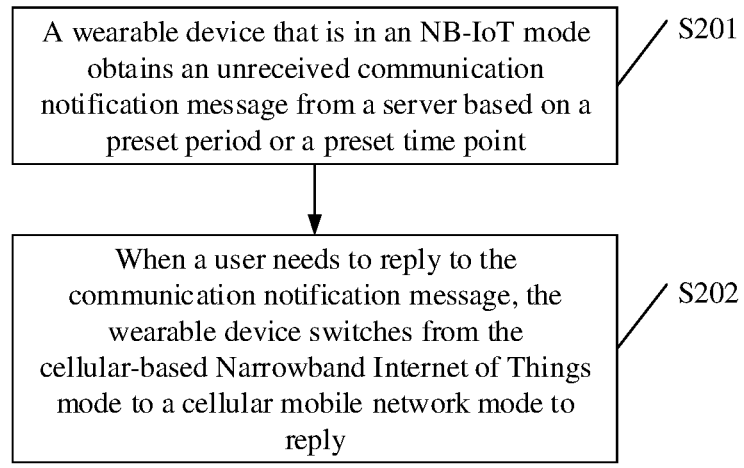
FIG. 2 is a schematic flowchart of a communication method according to an embodiment of this application.
Figure 3:
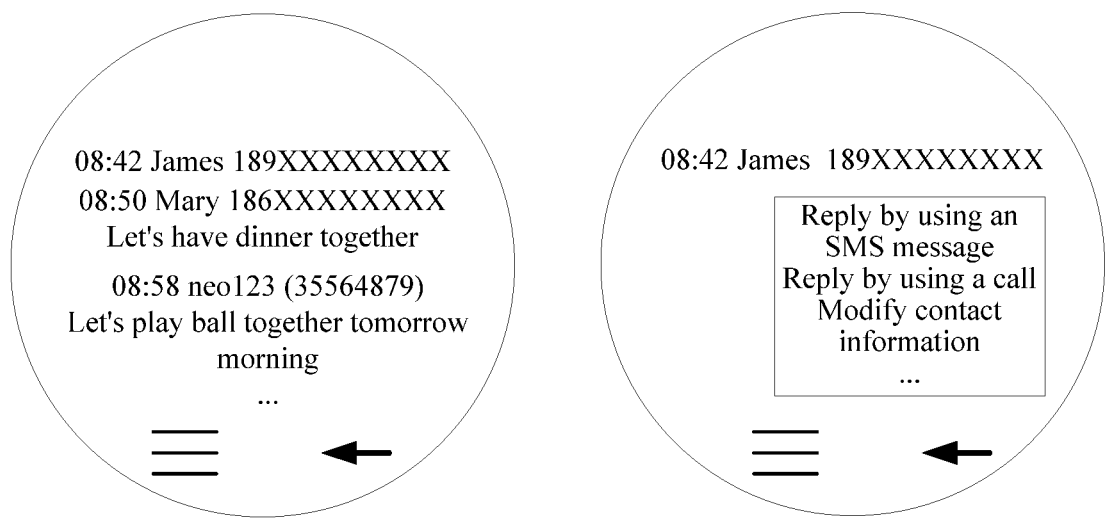
FIG. 3 is a schematic diagram of display on an operating interface of a wearable device according to an embodiment of this application.
Figure 4:
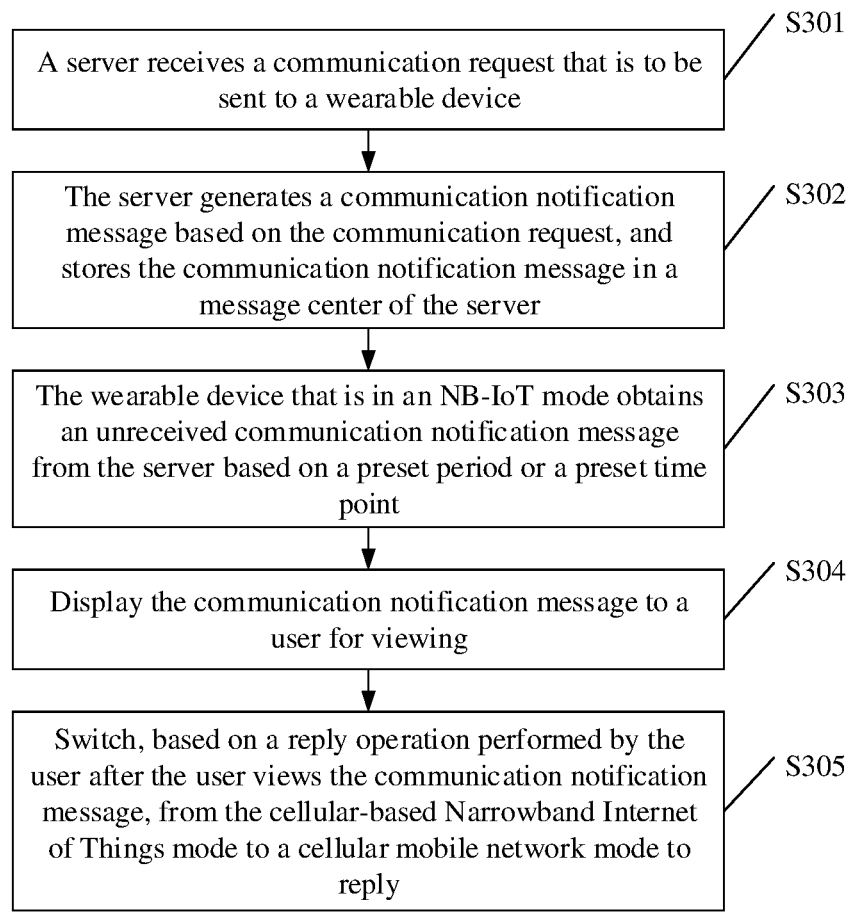
FIG. 4 is a schematic flowchart of another communication method according to an embodiment of this application.

The following describes communication methods of this application in detail with reference to FIG. 2 to FIG. 4.

FIG. 2 is a schematic flowchart of a communication method according to an embodiment of this application. The following steps are specifically included.

S201. A wearable device that is in an NB-IoT mode obtains an unreceived communication notification message from a server based on a preset period or a preset time point.

Optionally, when the wearable device does not need to reply to a message, usually the wearable device may be in a low-power NB-IoT mode, so as to greatly decrease power consumption of the wearable device and prolong a usage time.

A configuration of the preset period may be as follows: At delivery of the wearable device, several options such as one hour and two hours may be preset for the user to select; or the user may define the preset period based on a requirement of the user. For example, if a user A has a relatively large quantity of calls, the user A may configure that the wearable device obtains a communication notification message once every 30 minutes or once every 10 minutes; if a user B has a relatively small quantity of calls, the user B may configure that the wearable device obtains a communication notification message once every two hours.

The preset time point may be configured based on a usage habit of the user. For example, if the user A is used to jogging at 08:00 a.m., the user A may configure that the wearable device obtains a communication notification message at 08:55 a.m. every morning; if the user B is used to having an afternoon nap from 13:00 to 14:00, the user B may configure that a communication notification message is obtained at 14:05 every day.

Optionally, the communication notification message may include but is not limited to a call notification message, an SMS message notification message, or an instant communication application notification message.

Certainly, the communication notification message may further include a notification message pushed by an application or a notification message of a system, where the notification messages provide a notification function and may not need to be replied to.

Specific functions of the server also vary based on different types of messages. For example, when the call notification message and the SMS message notification message need to be obtained, the call notification message and the SMS message notification message may be obtained from a server configured for a base station; when an application notification message needs to be obtained, the application notification message may be obtained from a server of an application service provider.

The server may buffer a communication notification message related to the wearable device, and the communication notification message may include a message that has been sent to the wearable device; therefore, when obtaining a message, the wearable device may perform filtering based on reference factors, such as a message initiation contact or initiation time, to obtain an unreceived communication notification message. Certainly, for a received notification message that is not viewed by the user, the wearable device may prompt the user to view the notification message, and if the notification message that is not viewed is deleted by mistake, the wearable device may also obtain the notification message from the server again.

Optionally, when obtaining the unreceived communication notification message, the wearable device may further perform filtering according to a filter condition preconfigured by the user.

Optionally, the filter condition includes at least one of the following.

A communication notification message initiated by a contact in a contact whitelist is obtained. For example, if a contact C is an important contact such as a business partner or a parent, each time when a communication notification message is obtained, a communication notification message initiated by the contact C is obtained. The communication notification message initiated by the contact C herein is a corresponding communication notification message generated by the server based on a communication request that is sent by the contact C to the wearable device or a mobile terminal corresponding to the wearable device. This communication notification message may be referred to as the communication notification message initiated by the contact C.

A preset quantity of communication notification messages are obtained. For example, obtaining five or 10 communication notification messages each time may be configured, and if a quantity of unreceived messages is greater than the configured quantity, filtering may be performed with reference to another filter condition or five or 10 latest communication notification messages may be obtained in priority.

A communication notification message initiated by a contact with a preset priority is obtained. For example, contacts may be managed through priority classification, a communication notification message of a contact whose priority is high or whose priority is higher than a priority level is obtained, and a communication notification message of a contact whose priority is low or whose priority is lower than a priority level may not be obtained temporarily but is processed subsequently.

A communication notification message generated by an application with a preset priority is obtained. This is similar to obtaining the communication notification message initiated by the contact with the preset priority, and details are not described herein again.

A communication notification message that is not received in the preset period is obtained. For example, if the preset period is two hours and a communication notification message is already obtained at 09:00 a.m., all communication notification messages that are not received in a time period from 09:00 a.m. to 11:00 a.m. may be obtained at 11:00 a.m.

A communication notification message that is not viewed or not received within preset duration preceding the preset time point is obtained. For example, if the preset time point is 09:00 a.m. and the preset duration is one hour, all communication notification messages that are not viewed or not received in a time period from 8:00 a.m. to 09:00 a.m. may be obtained at 09:00 a.m.

It should be noted that, the foregoing filter criteria may be independently used or may be used in combination. This is not limited in this embodiment of this application. For example, obtaining the preset quantity of communication notification messages may be combined with obtaining the communication notification message that is not received in the preset period. A quantity of communication notification messages that are not received in the preset period may be relatively large; therefore, to reduce disturbance to the user, five latest communication notification messages that are not received in the preset period may be obtained.

S202. When a user needs to reply to the communication notification message, the wearable device switches from the cellular-based Narrowband Internet of Things mode to a cellular mobile network mode to reply.

Optionally, a manner in which the user learns of content of the communication notification message may be determined based on a hardware configuration and a message notification manner of the wearable device. For example, if a display is configured for the wearable device, the user may directly view the content of the communication notification message by using the display; if no display but a loudspeaker is configured for the wearable device, or both a display and a loudspeaker are configured for the wearable device and a notification manner of the wearable device is configured as a voice notification manner, the user may learn of the content of the communication notification message by using a voice notification of the wearable device.

Optionally, that when a user needs to reply to the communication notification message, the wearable device switches from the cellular-based Narrowband Internet of Things mode to a cellular mobile network mode to reply includes the following content.

If the communication notification message is the call notification message, the wearable device switches, according to a dialing instruction entered by the user, from the cellular-based Narrowband Internet of Things mode to the cellular mobile network mode to dial.

Optionally, the communication notification message may include a contact phone number of an in-coming call, and the user may view a contact name, the number, and a time of the in-coming call, and click the contact name or the number of the in-coming call to call back, or may choose to reply by using an SMS message.

If the communication notification message is the SMS message notification message, the wearable device switches, according to a dialing instruction entered by the user, from the cellular-based Narrowband Internet of Things mode to the cellular mobile network mode to dial, or switches, according to SMS message reply content and an SMS message reply instruction that are entered by the user, from the cellular-based Narrowband Internet of Things mode to the cellular mobile network mode to reply by using an SMS message.

Optionally, the communication notification message may include a contact phone number of an SMS message, and the user may view a contact name, the number, content, and a sending time of the SMS message, and click the contact name or the number of the SMS message to call back, or may directly choose to reply by using an SMS message.

If the communication notification message is the instant communication application notification message, the wearable device switches, according to reply content and a reply instruction that are entered by the user, from the cellular-based Narrowband Internet of Things mode to the cellular mobile network mode to reply.

Optionally, the communication notification message may include information about a contact that sends a message in an instant communication application, and the user may view a contact name, message content, and a sending time, and enter reply content to reply.

Optionally, a smartwatch is used as an example. A display interface of the smartwatch is circular, as shown in FIG. 3. The left figure of FIG. 3 is a schematic diagram of a possible display interface when a user views a communication notification message. The display interface may include a plurality of communication notification messages, for example, a first communication notification message is a notification message of a missed call dialed by James at 08:42 by using a phone of which a number is 189XXXXXXXX; a second communication notification message is a notification message of an SMS message sent by Mary at 08:50 by using a phone of which a number is 186XXXXXXXX, and content of the SMS message is "Let's eat dinner together"; and a third communication notification message is an instant communication application notification message sent at 08:58 by a contact whose nickname is neo123 (an instant communication application ID corresponding to the nickname is 35564879) in an instant communication application, and content of the message is "Let's play ball together tomorrow morning". Optionally, a lower part of the display interface further includes a menu key represented by a pattern of three horizontal lines and a back key represented by a leftward arrow. The user may click the menu key to perform setting and another function operation that are specific for applications, and the back key may be used to return to an upper-level directory or a system desktop. After the user clicks a communication notification message, a dialog box may be displayed for the user to choose to reply or another operation. As shown by the right figure of FIG. 3, for example, when the user clicks a first piece of information, function options such as "reply by using an SMS message, reply by calling, and modify contact information" may be displayed for the user to select and reply. Certainly, directly calling back after clicking may alternatively be configured. This is not limited in this embodiment of the present invention.

It should be noted that, for intuitiveness of description, FIG. 3 shows only a schematic diagram of interface displaying of a wearable device as an example. A specific displaying manner is not limited in this embodiment of this application.

The wearable device is regularly connected to the server by using a Narrowband Internet of Things (NB-IoT) technology, thereby establishing a data channel with the server and maintaining real-time connection for a period of time to regularly obtain the communication notification message. A low-power operating status of the wearable device is implemented, and transmission of a voice data service can also be ensured. This greatly improves user experience. In addition, compatibility with an existing cellular communications technology is achieved, so that implementation costs are relatively low.

It should be noted that, when the wearable device and the mobile terminal use respective independent subscriber identity module (Subscriber Identification Module, SIM) cards, the communication notification message may be generated based on a communication request that is to be sent to the wearable device; when the wearable device shares a SIM card with the mobile terminal, the communication notification message is generated based on a communication request that is to be sent to the mobile terminal.

Figure 5:
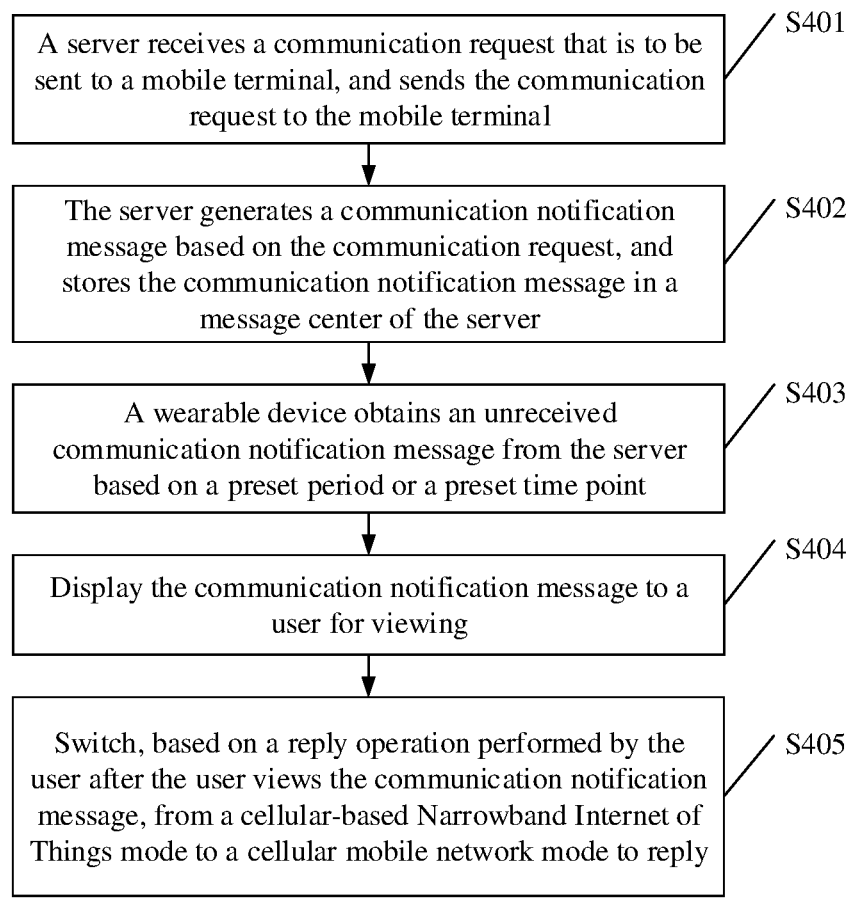
FIG. 5 is a schematic flowchart of still another communication method according to an embodiment of this application.

The following provides description with reference to FIG. 4 and FIG. 5.

FIG. 4 is a schematic flowchart of another communication method according to an embodiment of this application. In this embodiment, a wearable device and a mobile terminal, such as a mobile phone or a tablet computer, use respective independent SIM cards. When the wearable device is in a cellular mobile network mode, another user sends a communication request to the wearable device, and a base station may send the communication request to the wearable device, to establish voice communication between the another user and the wearable device. When the method is combined into this embodiment, to reduce power consumption of the wearable device, the following process may be used.

S301. A server receives the communication request that is to be sent to the wearable device, such as an in-coming call, an SMS message, or an instant communication application message.

S302. The server generates a communication notification message based on the communication request, and stores the communication notification message in a message center of the server.

Communication notification messages stored in the message center may be periodically removed.

For example, a removing period such as one day or one week may be set, to remove a communication notification message that has been sent to the wearable device. Alternatively, a fixed time point, such as 24:00 every Sunday, may be set, to remove a communication notification message that has been sent to the wearable device. An unsent communication notification message is still stored.

S303. The wearable device that is in an NB-IoT mode obtains an unreceived communication notification message from the server based on a preset period or a preset time point.

For example, the preset period may be set according to user setting, for example, may be set to 30 minutes, and the wearable device obtains an unreceived communication notification message once every 30 minutes from a base station or an operator server. Alternatively, a user may wake up the wearable device at the preset time point based on a behavior habit or preference of the user. If the user is used to viewing a communication notification message on the wearable device at 09:00 a.m. after sports, the wearable device may obtain the communication notification message at or before 09:00 a.m.

S304. Display the communication notification message to a user for viewing.

Based on a size of a display, communication contact information, a communication initiation time, and specific communication content may be selectively displayed, so as to help the user to reply. In addition to the display manner, another presentation manner, such as a voice prompt, may also be used. This is not limited in this embodiment of this application.

S305. Switch, based on a reply operation performed by the user after the user views the communication notification message, from the cellular-based Narrowband Internet of Things mode to the cellular mobile network mode to reply.

A specific reply manner may be determined based on a type of the communication notification message (a call notification message, an SMS message notification message, or an instant communication application notification message). Refer to the description of the embodiment shown in FIG. 2. Details are not described herein again.

FIG. 5 is a schematic flowchart of still another communication method according to an embodiment of this application. In this embodiment, a wearable device shares a SIM card with a mobile terminal, such as a mobile phone or a tablet computer. When the wearable device is in a cellular mobile network mode, another user sends a communication request to the wearable device, and a base station may send the communication request to the wearable device and the mobile terminal. When the method is combined into this embodiment, to reduce power consumption of the wearable device, the following process may be used.

S401. A server receives the communication request that is to be sent to the mobile terminal, such as an in-coming call, an SMS message, or an instant communication application message, and sends the communication request to the mobile terminal.

If a user currently uses the mobile terminal, the user may use the mobile terminal for viewing and replying; if the user currently does not carry the mobile terminal but uses the wearable device that is more portable, the user may use the wearable device that is in the cellular mobile network mode for viewing and replying; if the wearable device is in an NB-IoT mode, replying cannot be performed temporarily.

S402. The server generates a communication notification message based on the communication request, and stores the communication notification message in a message center of the server.

Communication notification messages stored in the message center may be periodically removed.

For example, a removing period such as one day or one week may be set, to remove a communication notification message that has been sent to the wearable device. Alternatively, a fixed time point, such as 24:00 every Sunday, may be set, to remove a communication notification message that has been sent to the wearable device. An unsent communication notification message is still stored.

S403. The wearable device that is in an NB-IoT mode obtains an unreceived communication notification message from the server based on a preset period or a preset time point.

S404. Display the communication notification message to a user for viewing.

Based on a size of a display, communication contact information, a communication initiation time, and specific communication content may be selectively displayed, so as to help the user to reply.

S405. Switch, based on a reply operation performed by the user after the user views the communication notification message, from the cellular-based Narrowband Internet of Things mode to the cellular mobile network mode to reply.

Figure 6:
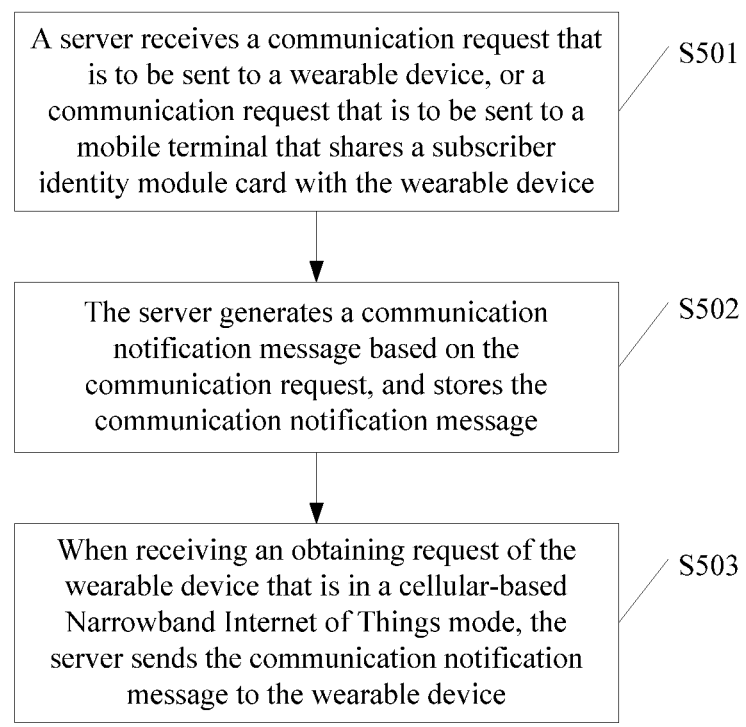
FIG. 6 is a schematic flowchart of yet another communication method according to an embodiment of this application.

FIG. 6 is a schematic flowchart of yet another communication method according to an embodiment of this application. The following steps are included.

S501. A server receives a communication request that is to be sent to a wearable device, or a communication request that is to be sent to a mobile terminal that shares a subscriber identity module card with the wearable device.

S502. The server generates a communication notification message based on the communication request, and stores the communication notification message.

S503. When receiving an obtaining request of the wearable device that is in a cellular-based Narrowband Internet of Things mode, the server sends the communication notification message to the wearable device.

Optionally, the communication notification message includes a call notification message, an SMS message notification message, or an instant communication application notification message.

Optionally, when sending the communication notification message to the wearable device, the server may perform filtering according to a filter condition preconfigured by a user.

The filter condition includes at least one of the following:
sending a communication notification message initiated by a contact in a contact whitelist;
sending a preset quantity of communication notification messages;
sending a communication notification message initiated by a contact with a preset priority;
sending a communication notification message generated by an application with a preset priority;
sending a communication notification message that is not received by the wearable device in the preset period; and
sending a communication notification message that is not viewed or not received by the wearable device within preset duration preceding the preset time point.

It should be noted that FIG. 6 is basically method descriptions on a server side. For a specific process thereof, refer to the descriptions of FIG. 2 to FIG. 5. Details are not described herein again.

Figure 7:
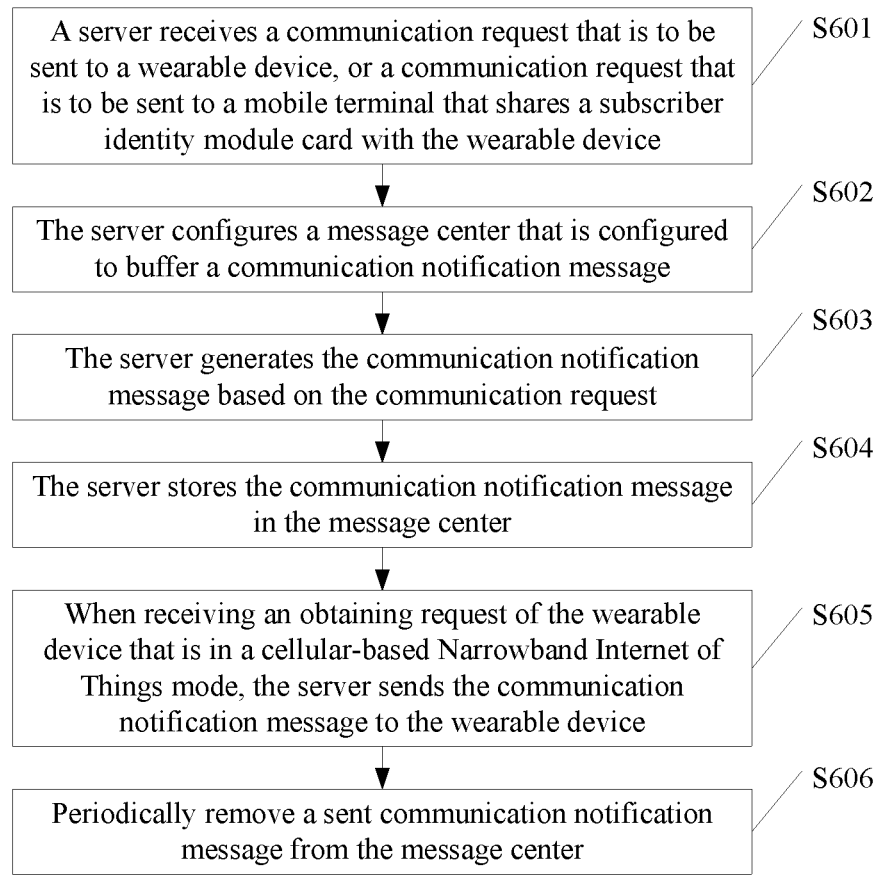
FIG. 7 is a schematic flowchart of still yet another communication method according to an embodiment of this application.

FIG. 7 is a schematic flowchart of still yet another communication method according to an embodiment of this application. The following steps may be included.

S601. A server receives a communication request that is to be sent to a wearable device, or a communication request that is to be sent to a mobile terminal that shares a subscriber identity module card with the wearable device.

S602. The server configures a message center that is configured to buffer a communication notification message.

S603. The server generates the communication notification message based on the communication request.

S604. The server stores the communication notification message in the message center.

Optionally, the message center herein may be a storage space in the server and may be presented as a message center on a management end. All communication notification messages to be sent to the wearable device may be stored in the message center, and a management operation, such as viewing, modifying, deleting, or sequencing, may be performed on the communication notification messages. The communication notification messages may be separately stored based on an identity, such as a SIM number, of the wearable device. A communication notification message corresponding to each wearable device may also be sequenced based on a type, an initiation time, or the like of the communication notification message. This is not limited in this embodiment of this application.

S605. When receiving an obtaining request of the wearable device that is in a cellular-based Narrowband Internet of Things mode, the server sends the communication notification message to the wearable device.

S606. Periodically remove a sent communication notification message from the message center.

For example, a removing period such as one day or one week may be set, to remove a communication notification message that has been sent to the wearable device. Alternatively, a fixed time point, such as 24:00 every Sunday, may be set, to remove a communication notification message that has been sent to the wearable device. An unsent communication notification message is still stored.

Figure 8:
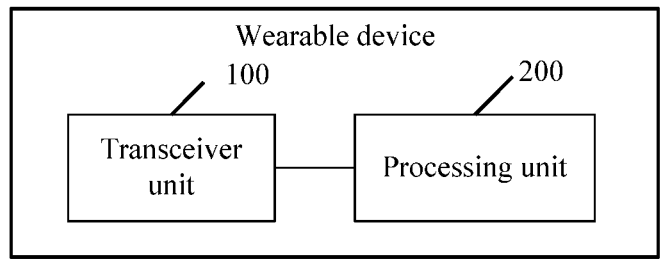
FIG. 8 is a schematic composition diagram of a wearable device according to an embodiment of this application.

FIG. 8 is a schematic composition diagram of a wearable device according to an embodiment of this application. The wearable device may include:

a transceiver unit 100, configured to obtain, for the wearable device that is in a cellular-based Narrowband Internet of Things mode, an unreceived communication notification message from a server based on a preset period or a preset time point; and a processing unit 200, configured to: when a user needs to reply to the communication notification message, switch the wearable device from the cellular-based Narrowband Internet of Things mode to a cellular mobile network mode to reply.

The communication notification message includes a call notification message, an SMS message notification message, or an instant communication application notification message.

Optionally, if the wearable device uses an independent subscriber identity module card, the communication notification message is generated based on a communication request that is to be sent to the wearable device.

Optionally, if the wearable device shares a subscriber identity module card with a mobile terminal, the communication notification message is generated based on a communication request that is to be sent to the mobile terminal.

Optionally, the processing unit is further configured to:

when obtaining the unreceived communication notification message, perform filtering according to a filter condition preconfigured by the user.

Optionally, the filter condition includes at least one of the following:

obtaining a communication notification message initiated by a contact in a contact whitelist;

obtaining a preset quantity of communication notification messages;

obtaining a communication notification message initiated by a contact with a preset priority;

obtaining a communication notification message generated by an application with a preset priority;

obtaining a communication notification message that is not received in the preset period; and obtaining a communication notification message that is not viewed or not received within preset duration preceding the preset time point.

Optionally, if the communication notification message is the call notification message, the processing unit is configured to switch, according to a dialing instruction entered by the user, the wearable device from the cellular-based Narrowband Internet of Things mode to the cellular mobile network mode to dial.

If the communication notification message is the SMS message notification message, the processing unit is configured to switch, according to a dialing instruction entered by the user, the wearable device from the cellular-based Narrowband Internet of Things mode to the cellular mobile network mode to dial, or the processing unit is configured to switch, according to SMS message reply content and an SMS message reply instruction that are entered by the user, the wearable device from the cellular-based Narrowband Internet of Things mode to the cellular mobile network mode to reply by using an SMS message.

If the communication notification message is the instant communication application notification message, the processing unit is configured to switch, according to reply content and a reply instruction that are entered by the user, the wearable device from the cellular-based Narrowband Internet of Things mode to the cellular mobile network mode to reply.

Figure 9:
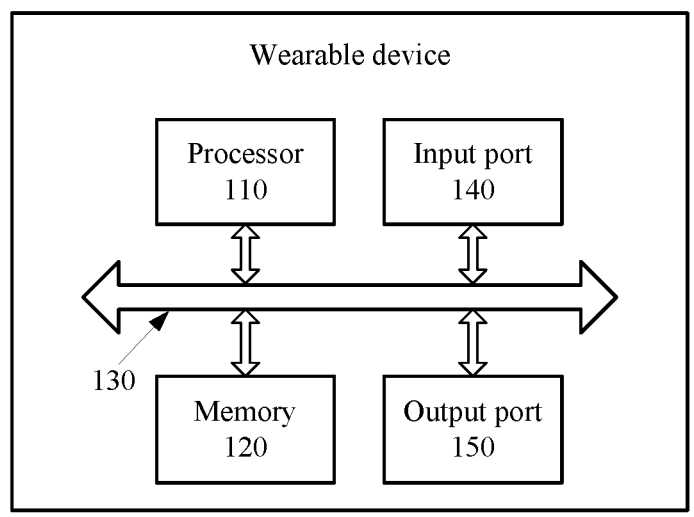
FIG. 9 is a schematic composition diagram of another wearable device according to an embodiment of this application.

FIG. 9 is a schematic composition diagram of another wearable device according to an embodiment of this application.

As shown in FIG. 9, the wearable device may include a processor 110, a memory 120, and a bus 130. The processor 110 and the memory 120 are connected by using the bus 130. The memory 120 is configured to store an instruction, and the processor 110 is configured to execute the instruction stored in the memory 120, to implement the steps in the methods corresponding to FIG. 2 to FIG. 5.

Further, the wearable device may further include an input port 140 and an output port 150. The processor 110, the memory 120, the input port 140, and the output port 150 may be connected by using the bus 130.

The processor 110 is configured to execute the instruction stored in the memory 120, to control the input port 140 to receive a signal and control the output port 150 to send a signal, so as to implement the steps performed by the wearable device in the foregoing methods. The input port 140 and the output port 150 may be a same physical entity or different physical entities. When being the same physical entity, the input port 140 and the output port 150 may be collectively referred to as an input/output port. The memory 120 may be integrated into the processor 110, or may be separate from the processor 110.

In a possible implementation, functions of the input port 140 and the output port 150 may be implemented by using a transceiver circuit or a dedicated transceiver chip. The processor 110 may be implemented by using a dedicated processing chip, a processing circuit, a processor, or a general-purpose chip.

In another implementation, the wearable device provided in this embodiment of this application may be implemented by using a general-purpose computer. To be specific, program code that implements functions of the processor 110, the input port 140, and the output port 150 is stored in the memory, and a general-purpose processor executes the code that is in the memory, to implement the functions of the processor 110, the input port 140, and the output port 150.

Optionally, the wearable device may further include a display 160 (which is not shown in the figure) or a loudspeaker 170 (which is not shown in the figure), to present a communication notification message to a user in a manner of a text, an image, or voice.

For a concept, an explanation, a detailed description, and other steps with respect to the wearable device that are related to the technical solutions provided in this embodiment of this application, refer to descriptions of the content in the foregoing methods or another embodiment. Details are not described herein again.

A person skilled in the art may understand that, for ease of description, FIG. 8 shows only one memory and one processor. In an actual wearable device, there may be a plurality of processors and memories. The memory may also be referred to as a storage medium, a storage device, or the like. This is not limited in this embodiment of this application.

Figure 10:
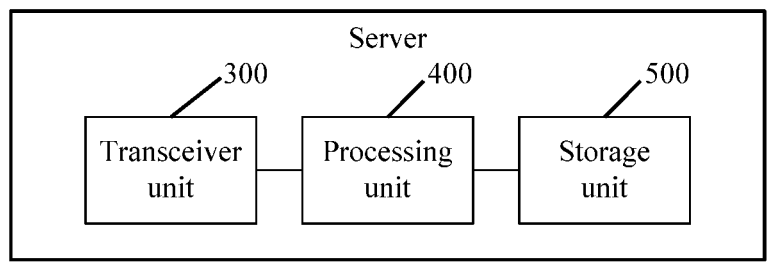
FIG. 10 is a schematic composition diagram of a server according to an embodiment of this application.

FIG. 10 is a schematic composition diagram of a server according to an embodiment of this application. The server may include:

a transceiver unit 300, configured to receive a communication request that is to be sent to a wearable device, or a communication request that is to be sent to a mobile terminal that shares a subscriber identity module card with the wearable device;

a processing unit 400, configured to generate a communication notification message based on the communication request; and a storage unit 500, configured to store the communication notification message.

The transceiver unit 300 is further configured to: when receiving an obtaining request of the wearable device that is in a cellular-based Narrowband Internet of Things mode, send the communication notification message to the wearable device.

Optionally, the communication notification message includes a call notification message, an SMS message notification message, or an instant communication application notification message.

Optionally, the processing unit 400 is further configured to:

when the communication notification message is being sent to the wearable device, perform filtering according to a filter condition preconfigured by a user.

Optionally, the filter condition includes at least one of the following:

sending a communication notification message initiated by a contact in a contact whitelist;

sending a preset quantity of communication notification messages;

sending a communication notification message initiated by a contact with a preset priority;

sending a communication notification message generated by an application with a preset priority;

sending a communication notification message that is not received by the wearable device in the preset period; and sending a communication notification message that is not viewed or not received by the wearable device within preset duration preceding the preset time point.

Optionally, the processing unit 400 is further configured to:

configure a message center that is configured to buffer the communication notification message;

generate the communication notification message based on the communication request; and store the communication notification message in the message center.

Optionally, the processing unit 400 is further configured to:

periodically remove a sent communication notification message from the message center.

Figure 11:
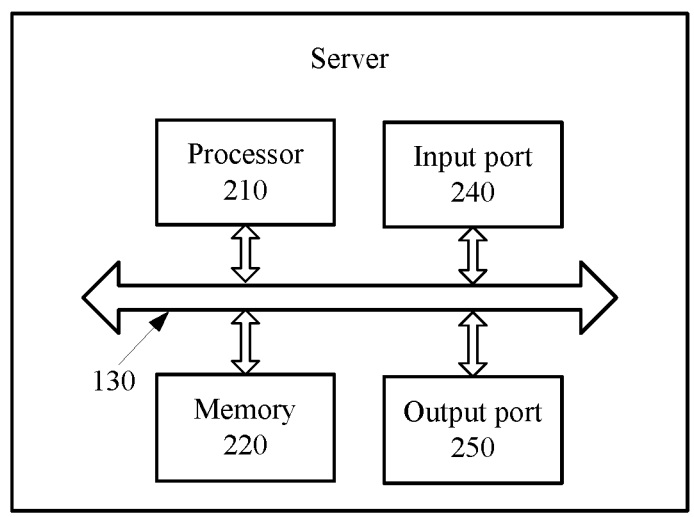
FIG. 11 is a schematic composition diagram of still another server according to an embodiment of this application.

FIG. 11 is a schematic composition diagram of another server according to an embodiment of this application. As shown in FIG. 11, the server may include a processor 210, a memory 220, and a bus 230. The processor 210 and the memory 220 are connected by using the bus 230. The memory 220 is configured to store an instruction and a communication notification message, and the processor 210 is configured to execute the instruction stored in the memory 220, to implement the steps in the methods corresponding to FIG. 6 and FIG. 7.

Further, the server may include an input port 240 and an output port 250. The processor 210, the memory 220, the input port 240, and the output port 250 may be connected by using the bus 230.

The processor 210 is configured to execute the instruction stored in the memory 220, to control the input port 240 to receive a signal and control the output port 250 to send a signal, so as to implement the steps performed by the server in the foregoing methods. The input port 240 and the output port 250 may be a same physical entity or different physical entities. When being the same physical entity, the input port 140 and the output port 150 may be collectively referred to as an input/output port. The memory 220 may be integrated into the processor 210, or may be separate from the processor 210.

In a possible implementation, functions of the input port 240 and the output port 250 may be implemented by using a transceiver circuit or a dedicated transceiver chip. The processor 210 may be implemented by using a dedicated processing chip, a processing circuit, a processor, or a general-purpose chip.

In another implementation, the server provided in this embodiment of this application may be implemented by using a general-purpose computer. To be specific, program code that implements functions of the processor 210, the input port 240, and the output port 250 is stored in the memory, and a general-purpose processor executes the code that is in the memory, to implement the functions of the processor 210, the input port 240, and the output port 250.

For a concept, an explanation, a detailed description, and other steps with respect to the server that are related to the technical solutions provided in this embodiment of this application, refer to descriptions of the content in the foregoing methods or another embodiment. Details are not described herein again.

A person skilled in the art may understand that, for ease of description, FIG. 11 shows only one memory and one processor. In an actual server, there may be a plurality of processors and memories. The memory may also be referred to as a storage medium, a storage device, or the like. This is not limited in this embodiment of this application.

It should be understood that, the processor in the embodiments of this application may be a central processing unit (Central Processing Unit, "CPU" for short), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor, or the like.

The memory may include a read-only memory and a random access memory, and provide an instruction and data for the processor. A part of the memory may further include a non-volatile random access memory.

The bus may further include a power bus, a control bus, a status signal bus, and the like, in addition to a data bus. However, for clarity of description, various buses are all marked as the bus in the figure.

In an implementation process, each step of the foregoing methods may be completed by using an integrated logic circuit of hardware in the processor or by using an instruction in a form of software. The steps of the methods disclosed with reference to the embodiments of this application may be directly performed and completed by using a hardware processor, or may be performed and completed by using a combination of hardware in the processor and a software module. The software module may be located in a mature storage medium in the field, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

According to the methods provided in the embodiments of this application, an embodiment of this application further provides a system, including the foregoing wearable device, the foregoing server, and a first mobile terminal. The first mobile terminal is configured to send a communication request to the wearable device or a second terminal that shares a subscriber identity module card with the wearable device.

It should be further understood that the numbers such as "first", "second", "third", and "fourth" in this specification are merely for distinguishing for ease of description, and are not intended to limit the scope of the embodiments of the present invention.

It should be understood that, in various embodiments of this application, sequence numbers of the foregoing processes do not mean execution sequences. The execution sequences of the processes should be determined based on functions and internal logic of the processes, and should not be construed as any limitation on the implementation processes of the embodiments of the present invention.

A person of ordinary skill in the art may be aware that, various illustrative logical blocks (illustrative logic block) and steps (step) that are described with reference to the embodiments disclosed in this specification can be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, the processes or functions according to the embodiments of the present invention are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   obtaining, by a wearable device that is in a cellular-based Narrowband Internet of Things mode, a communication notification message from a server via a base station based on a preset period or a preset time point; and
   upon receipt of a user reply operation in response to the communication notification message, switching the wearable device from the cellular-based Narrowband Internet of Things mode to a cellular mobile network mode to reply;
   if the wearable device shares a subscriber identity module card with a mobile terminal, the communication notification message is generated based on a communication request that is to be sent to the mobile terminal.

2. The method according to claim 1, wherein the communication notification message comprises a call notification message, an SMS message notification message, or an instant communication application notification message.

3. The method according to claim 1, wherein
   if the wearable device uses an independent subscriber identity module card, the communication notification message is generated based on a communication request that is to be sent to the wearable device.

4. The method according to claim 1, wherein the method further comprises:
   when obtaining the communication notification message, performing filtering according to a filter condition.

5. The method according to claim 4, wherein the filter condition comprises at least one of the following:
   obtaining a communication notification message initiated by a contact in a contact whitelist;
   obtaining a preset quantity of communication notification messages;
   obtaining a communication notification message initiated by a contact with a preset priority;
   obtaining a communication notification message generated by an application with a preset priority;
   obtaining a communication notification message that is not received in the preset period; or
   obtaining a communication notification message that is not viewed or not received within preset duration preceding the preset time point.

6. The method according to claim 1, wherein the switching the wearable device from the cellular-based Narrowband Internet of Things mode to a cellular mobile network mode to reply comprises:
  if the communication notification message is a call notification message, switching, according to a user-entered dialing instruction, from the cellular-based Narrowband Internet of Things mode to the cellular mobile network mode to dial;
  if the communication notification message is a SMS message notification message, switching, according to a user-entered dialing instruction, from the cellular-based Narrowband Internet of Things mode to the cellular mobile network mode to dial, or switching, according to user-entered SMS message reply content and a user-entered SMS message reply instruction, from the cellular-based Narrowband Internet of Things mode to the cellular mobile network mode to reply by using an SMS message; or
  if the communication notification message is an instant communication application notification message, switching, according to user-entered reply content and a user-entered reply instruction, from the cellular-based Narrowband Internet of Things mode to the cellular mobile network mode to reply.

7. A wearable device, comprising:
  a transceiver, configured to obtain, when the wearable device is in a cellular-based Narrowband Internet of Things mode, a communication notification message from a server based on a preset period or a preset time point; and
  at least one processor, configured to: upon receipt of a user reply operation in response to the communication notification message, switch the wearable device from the cellular-based Narrowband Internet of Things mode to a cellular mobile network mode to reply;
  wherein if the wearable device uses an independent subscriber identity module card, the communication notification message is generated based on a communication request that is to be sent to the wearable device.

8. The wearable device according to claim 7, wherein the communication notification message comprises a call notification message, an SMS message notification message, or an instant communication application notification message.

9. The wearable device according to claim 7, wherein if the wearable device shares a subscriber identity module card with a mobile terminal, the communication notification message is generated based on a communication request that is to be sent to the mobile terminal.

10. The wearable device according to claim 7, wherein the processor is further configured to:
  when obtaining the communication notification message, perform filtering according to a filter condition.

11. The wearable device according to claim 10, wherein the filter condition comprises at least one of the following:
  obtaining a communication notification message initiated by a contact in a contact whitelist;
  obtaining a preset quantity of communication notification messages;
  obtaining a communication notification message initiated by a contact with a preset priority;
  obtaining a communication notification message generated by an application with a preset priority;
  obtaining a communication notification message that is not received in the preset period; or
  obtaining a communication notification message that is not viewed or not received within preset duration preceding the preset time point.

12. The wearable device according to claim 7, wherein
  if the communication notification message is a call notification message, the processor is configured to switch, according to a user-entered dialing instruction, the wearable device from the cellular-based Narrowband Internet of Things mode to the cellular mobile network mode to dial;
  if the communication notification message is a SMS message notification message, the processor is configured to switch, according to a user-entered dialing instruction, the wearable device from the cellular-based Narrowband Internet of Things mode to the cellular mobile network mode to dial, or the processor is configured to switch, according to user-entered SMS message reply content and a user-entered SMS message reply instruction, the wearable device from the cellular-based Narrowband Internet of Things mode to the cellular mobile network mode to reply by using an SMS message; or
  if the communication notification message is an instant communication application notification message, the processor is configured to switch, according to user-entered reply content and a user-entered reply instruction, the wearable device from the cellular-based Narrowband Internet of Things mode to the cellular mobile network mode to reply.

13. A server, comprising:
  a transceiver, configured to receive a communication request that is to be sent to a wearable device, or a communication request that is to be sent to a mobile terminal that shares a subscriber identity module card with the wearable device;
  at least one processor, configured to generate a communication notification message based on the communication request; and
  a storage memory, configured to store the communication notification message; wherein
  the transceiver is further configured to: when an obtaining request of the wearable device that is in a cellular-based Narrowband Internet of Things mode is received, send the communication notification message to the wearable device; and
  the processor is further configured to: when sending the communication notification message to the wearable device, perform filtering according to a filter condition.

14. The server according to claim 13, wherein the filter condition comprises at least one of the following:
  sending a communication notification message initiated by a contact in a contact whitelist;
  sending a preset quantity of communication notification messages;
  sending a communication notification message initiated by a contact with a preset priority;
  sending a communication notification message generated by an application with a preset priority;
  sending a communication notification message that is not received by the wearable device in the preset period; or
  sending a communication notification message that is not viewed or not received by the wearable device within preset duration preceding the preset time point.

15. The server according to claim 13, wherein the processor is further configured to:
  configure a message center to buffer the communication notification message;

generate the communication notification message based on the communication request; and store the communication notification message in the message center.

16. The server according to claim 15, wherein the processor is further configured to:

periodically remove a sent communication notification message from the message center.

* * * * *